Figure 4:
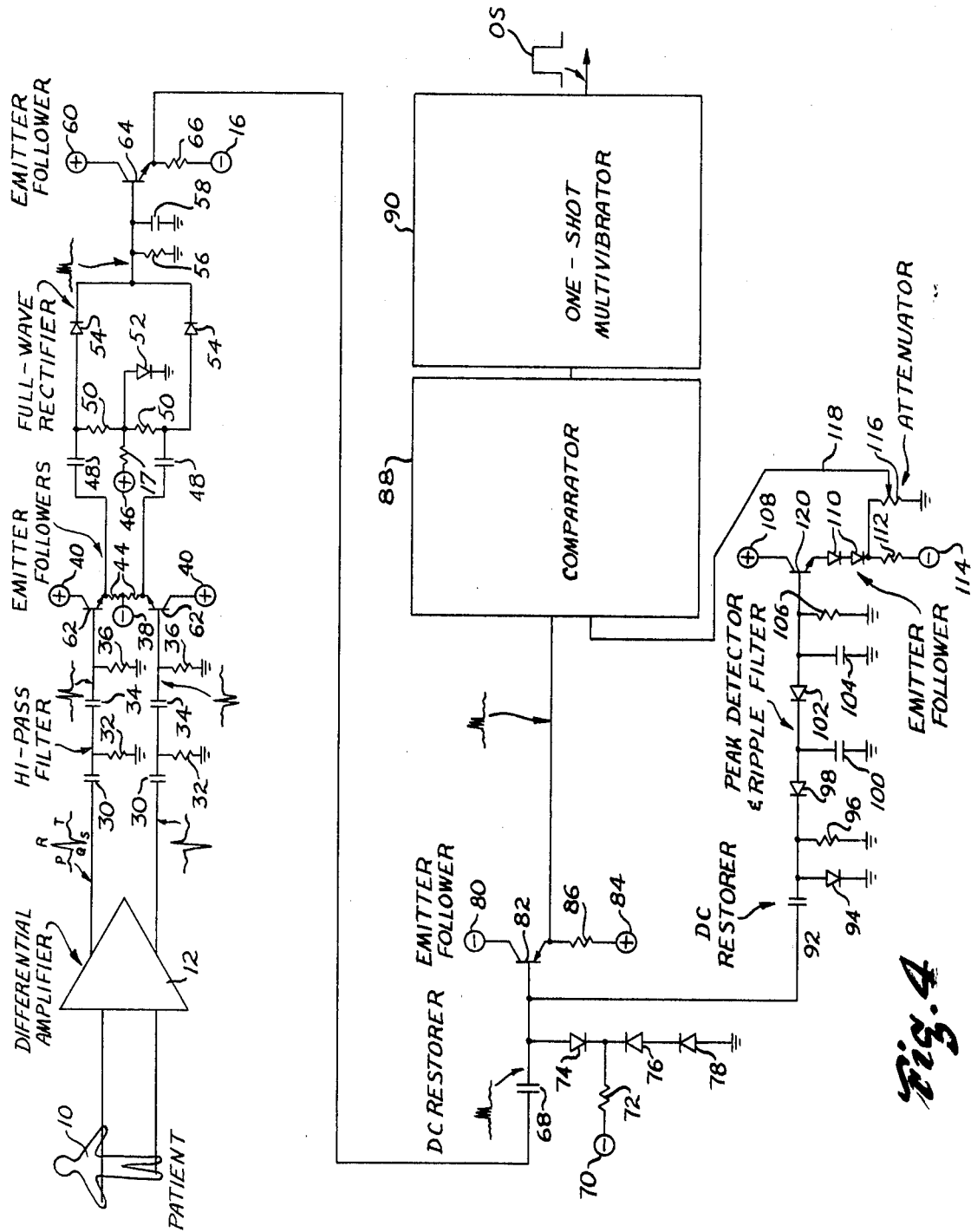

United States Patent

[11] 3,590,811

| [72] | Inventor | George J. Harris<br>Framingham, Mass. |
|---|---|---|
| [21] | Appl. No | 781,896 |
| [22] | Filed | Dec. 6, 1968 |
| [45] | Patented | July 6, 1971 |
| [73] | Assignee | American Optical Corporation<br>Southbridge, Mass. |

[54] ELECTROCARDIOGRAPHIC R-WAVE DETECTOR
5 Claims, 12 Drawing Figs.

[52] U.S. Cl. ................................................. 128/2.06,
307/264, 328/147, 328/150, 328/171
[51] Int. Cl. ...................................................... A61b 5/04
[50] Field of Search ............................................ 128/2.05
M, 2.05 P, 2.05 S, 2.05 T, 2.06; 307/235, 236, 264;
328/115—118, 146, 147, 150, 171

[56] References Cited
UNITED STATES PATENTS

| 3,094,665 | 6/1963 | Wildman | 328/117 X |
| 3,174,478 | 3/1965 | Kahn | 128/2.06 |
| 3,392,307 | 7/1968 | Monnier | 328/147 X |
| 3,502,993 | 3/1970 | Schurzinger et al. | 328/146 X |

*Primary Examiner*—William E. Kamm
*Attorneys*—William C. Nealon, Noble S. Williams and Robert J. Bird ABSTRACT: An electrocardiographic R-wave detection circuit in which the ECG. signal is applied to one input of a comparator. The threshold level, applied to the other input of the comparator, is below the peak of the R-wave, and above the peaks of the P and T waves. The amplitude of the ECG. signal can vary over a wide range depending upon the placement of electrodes, etc. For this reason, the threshold level is continuously adjustable in accordance with the peak swing of the input signal. The threshold level is a fraction of the peak signal swing, the selected fraction being such that the threshold level always falls between the peak of the R-wave and the peaks of the P- and T-waves. The threshold level adjustment circuit has a time constant of approximately 10 seconds. The circuit is thus enabled to operate linearly over a very wide range of signal magnitudes.

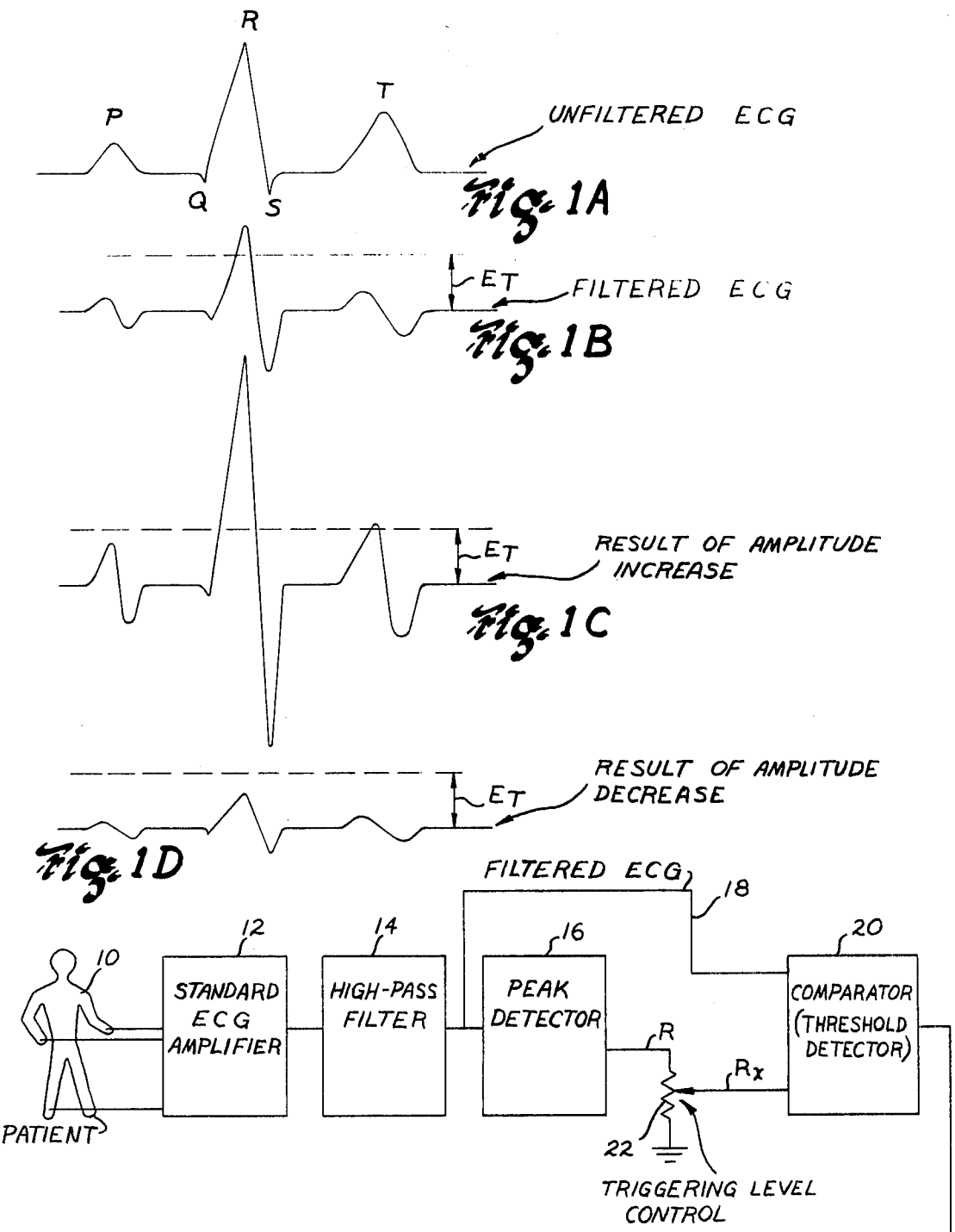

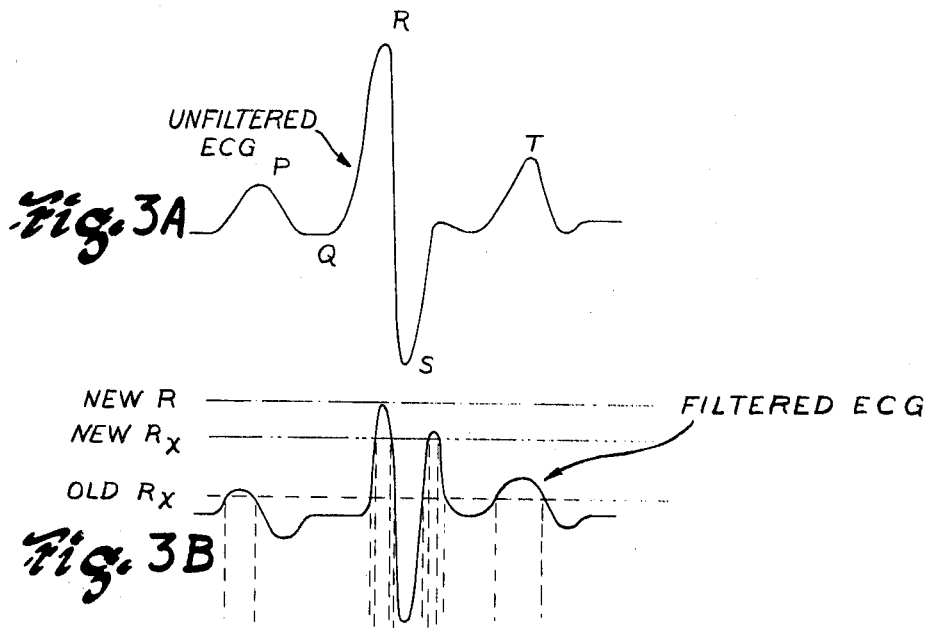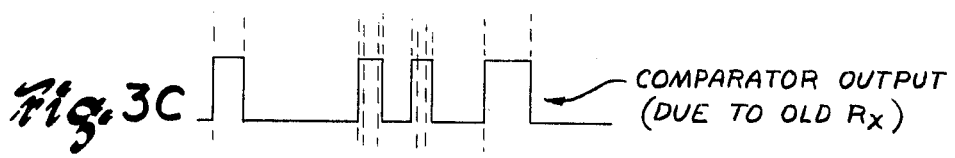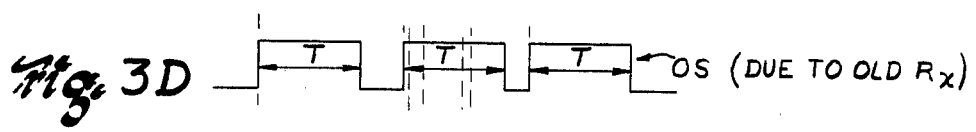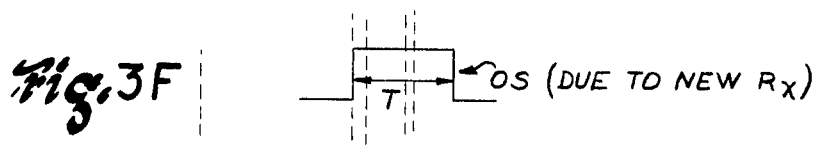

ELECTROCARDIOGRAPHIC R-WAVE DETECTOR

This invention relates to electrocardiographic monitoring systems, and more particularly to R-wave detection circuits.

Almost all electrocardiographic systems in use at the present time include a circuit for measuring the heart rate. Typically, the electrical activity of the heart is sensed and sometimes recorded as an ECG. waveform. The waveform, one for each heartbeat, contains several distinct characteristics generally labeled P, Q, R, S, and T according to common medical usage. Of the various component parts of the waveform, the R wave is by far the easiest to detect and is almost universally used in all electrical schemes of measuring heart rate and detecting premature beats.

Generally, the ECG. waveform includes three positive peaks, P, R and T. Usually, the R-peak is the largest. Since it is necessary that only one peak be detected for each heartbeat, a threshold detector can be employed in the simple case to distinguish between P and T waves, on the one hand, and R-waves, on the other. Only the R-peaks trigger the threshold detector to generate another heartbeat count.

Unfortunately, quite often the P- and/or T-waves are taller than the R-waves, so that a simple comparator operating directly on the unfiltered ECG. waveform would register multiple counts for each heartbeat since the P- and/or T-waves would be registered along with the R-wave as they also exceed the threshold level. To control this problem most of the monitoring devices now in use employ some form of filtering to attenuate P- and T-waves in relation to R-waves. This can be done because R-waves contain higher frequencies than the other parts of the ECG. waveform; a high pass filter will attenuate P- and T-waves more than R-waves. Thus, in almost all cases it is safe to assume that with the use of such a filter the peaks of the R-waves are always higher than the peaks of the P- and T-waves.

But this, too, has proved insufficient in many cases. It is possible for the amplitude of the entire ECG. waveform to increase or decrease depending on various factors such as switching to different lead combinations, deliberately increasing amplifier gain to better observe a particular feature on the monitor scope, or physiological changes in the patient. Thus, with a fixed threshold level, it is possible even for the R-peaks not to trigger the detector if the amplitude of the entire waveform drops sufficiently low such that the R-peaks are below the threshold level. Conversely, if the amplitude of the entire waveform increases sufficiently, it is possible for even the P- and/or T-waves to exceed the threshold level and for multiple counts to be registered for a single heartbeat.

The obvious solution to this problem is the use of an automatic gain control circuit such as those found in radio and television receivers. An AGC circuit is capable of providing an output waveform having a constant maximum amplitude independent of the amplitude of the input signal. If such a circuit is employed in an ECG. monitoring system, it would be adjusted to provide an ECG. signal to the threshold detector with an amplitude such that the R-peaks would exceed the threshold level while the P- and T-peaks would not. While an AGC circuit would appear to be the obvious solution to the problem, in fact it is unsatisfactory for a number of reasons. The main reason is that the ECG. signal strength can vary over a very wide range, so wide, in fact, that conventional ACG circuits cannot sufficiently adjust the overall gain in a linear manner.

It is a general object of my invention to provide, in an ECG. monitoring system, a circuit for registering the occurrence of each R-wave in an ECG. signal to the exclusion of P- and T-waves, independent of the amplitude of the ECG. signal.

Briefly, in accordance with the principles of my invention, a comparator (threshold detector) is employed to detect R-waves. The ECG. signal, as in the prior art, is filtered so that the R-waves are always greater than the P- and T-waves. The filtered ECG. signal is fed to one input of the comparator. The threshold level is applied to the other input of the comparator and whenever the filtered ECG. signal exceeds the threshold an output pulse is generated to indicate the occurrence of another R-wave. But, in my invention, the threshold level is continuously adjustable in accordance with the amplitude of the ECG. signal.

A peak detector is employed to determine the level of the peak of the R-waves. The comparator threshold level is derived from this detected R-wave peak. The comparator threshold level is a fraction of the R-wave peak, and while the threshold level is below the R-wave peak, it is also above the peaks of the P- and T-waves. Accordingly, the comparator detects a polarity change at its inputs only upon occurrence of an R-wave.

The threshold level (which is a constant fraction of the R-wave peak independent of the magnitude of the peak) follows the R-wave peaks. As the ECG. signal increases in amplitude, so does the threshold level. As the ECG. signal decreases in amplitude, the threshold level follows it. The peak detector is provided with a time constant in order of 10 seconds such that the threshold level changes relatively slowly with respect to the heartbeat rate. The threshold level is thus set in accordance with the average value of the ECG. signal. The threshold level is linearly adjustable over a wide range and can accommodate ECG. signals of very large varying amplitudes.

It is a feature of my invention, in the illustrative embodiment thereof, to employ a threshold level detector to detect R-waves in an ECG. signal, the signal input to the detector being a filtered ECG. signal and the threshold level of the detector being a constant fraction of the peak of the filtered ECG. signal.

It is another feature of my invention to select the fraction of the ECG. peak signal employed as the threshold level such that the peaks of the R-waves exceed the level while the peaks of the P- and T-waves are below the same level.

It is a still further feature of my invention to build into the peak detector a time constant considerably greater than the time interval between successive heartbeats in order that the threshold level change appreciably only after a number of heartbeat signals of a new amplitude have been detected.

Further objects, features and advantages of my invention will become apparent upon consideration of the following detailed description in conjunction with the drawings, in which:

FIGS. 1A—1D depict various signals useful in understanding the general problem to which the invention relates;

FIG. 2 is a block diagram schematic illustrating an illustrative embodiment of my invention;

FIGS. 3A—3F illustrate typical waveforms involved in the operation of the system of FIG. 2; and FIG. 4 is a more detailed schematic of another illustrative embodiment of my invention.

FIG. 1A illustrates a typical ECG. signal as detected by monitoring electrodes attached to the patient. The conventional P, Q, R, S and T waves are identified in accordance with common medical usage. As shown, the peak of the R-wave is larger than the peaks of the P- and T-waves. Although this is usually the case, in many situations the P- and/or T-wave peaks can exceed the peak of the R-wave. If the ECG. signal of FIG. 1A is fed through a high pass filter, the filtered ECG. signal is of the form shown in FIG. 1B. Because the frequency spectrum of the R-wave is much higher than those of the P- and T-waves, the P- and T-waves are attenuated with respect to the R-wave. With a threshold level of $E_T$, as shown in FIG. 1B, it is seen that the peak of only the R-wave exceeds the level. Of course, with the typical signal of FIG. 1A, there is no need for filtering in the first place since a threshold level can be selected between the peaks of the R- and T-waves. However, even in those cases where the P- and/or T-waves are larger than the R-wave, the filtering produces a waveform of the type shown in FIG. 1B where the R-wave peak exceeds those of the P- and T-waves.

But this filtering is insufficient in many cases. Consider FIG. 1C which pertains to the situation in which the ECG. signal increases in amplitude for one reason or another. The filtered ECG. signal similarly increases in amplitude, and it is seen that in this case the T-wave, while considerably lower than the R-wave peak, also exceeds the threshold level $E_T$. Consequently, two heartbeats are registered rather than one. Similarly, FIG. 1D pertains to the situation in which the ECG. signal decreases in amplitude. In this case, even the R-wave in the filtered signal does not exceed the threshold level and the heartbeat is missed. FIGS. 1C and 1D illustrate the need for a circuit which registers one and only one count for each R-wave.

An illustrative embodiment of the invention is shown in block diagram form in FIG. 2. A standard ECG. amplifier 12 is connected to patient 10 in the conventional manner. The output of this amplifier is a signal of the type depicted in FIG. 1A. This signal is passed through high pass filter 14 to produce a filtered ECG. signal of the type shown in FIG. 1B. The filtered ECG. signal is coupled over conductor 18 directly to one input of comparator (threshold detector) 20.

The filtered ECG. signal is also coupled to the input of peak detector 16. The output signal R from this peak detector is a DC voltage whose amplitude corresponds to the peak of the R-wave in FIG. 1B. The DC voltage is applied across triggering level control potentiometer 22. The center tap of the potentiometer is adjusted to apply a voltage level $R_x$ to the other input of the comparator. The fraction of the voltage which is applied to the second input of the comparator is selected by the potentiometer setting such that it is below the peak of the R-wave in the filtered ECG. signal, but above the peaks of the P- and T-waves in the same signal.

During most of the signal duration, the $R_x$ input of the comparator is at a voltage whose magnitude is greater than that of the signal on conductor 18. The output of the comparator remains deenergized. As soon as the R-wave exceeds the threshold level, however, the relative polarity of the two inputs to the comparator changes. At this time, the comparator output is energized. As soon as the comparator inputs change polarity once again (during the fall of the R-wave), the comparator output is deenergized. The energization of the comparator output triggers one-shot multivibrator 24 which produces an OS pulse to register the occurrence of another heartbeat.

The operation of the system of FIG. 2 can be better appreciated by considering the waveforms of FIGS. 3A—3F. FIG. 3A shows a typical ECG. signal. It will be noted that the signal of FIG. 3A is different from that of FIG. 1A. There is no such thing as a standard ECG. signal, and the "normal" signal varies from patient to patient. The signal of FIG. 3A is perhaps a bit extreme but will serve to illustrate better the operation of the circuits of FIGS. 2 and 4.

A high pass filter such as filter 14 in FIG. 2 is essentially a differentiator and the filtered ECG. signal on conductor 18 has the shape shown in FIG. 3B. It should be noted that the QRS complex of FIG. 3A, when differentiated, results in two positive peaks corresponding to the original R-wave.

Peak detector 16 functions to derive an output voltage R which equals the peak level of the R-wave. Triggering level control potentiometer 22 allows a fraction of this voltage, $R_x$, to be fed to the second input of comparator 20. On FIG. 3B, three levels are shown. The "NEW R" level depicts the peak of the R-wave at some arbitrary time. The "NEW $R_x$" level is a fraction of this R-level. It is assumed that sometime prior thereto the amplitude of the ECG. waveform was smaller and that the old R-level was smaller. The ratio of the "OLD $R_x$" level to the old R-level (old R-level not shown) is equal to the ratio of the "NEW $R_x$" level to the "NEW R" level.

It will be observed in FIG. 3B that the two R-peaks in the filtered ECG. signal both exceed the new $R_x$ level. As will be described below, as long as the threshold level $R_x$ is exceeded only by peaks corresponding to the R-wave, only one heartbeat count is generated. The P- and T-waves are both below the new $R_x$ level and consequently do not result in the registering of heartbeats.

Since the old $R_x$ level is below the new $R_x$ level, the previous ECG. signals must have had a lower amplitude. The old $R_x$ level is depicted only to show what would happen were the threshold level not adjustable. With the old level, it is assumed that only the two peaks corresponding to the R-wave exceeded this level and that only one count for each heartbeat was registered. Suddenly, the ECG. signal increases in amplitude. If the old $R_x$ level remains as the threshold value, it is apparent that both the P- and T-waves, at their peaks, also exceed this level. Three counts would be generated rather than only one. But because the threshold level increases with increasing signal amplitude in my invention, the new threshold level is above the new P- and T-peaks—only one count is generated.

FIG. 3C depicts the comparator output which would result from the old $R_x$ level. Since both peaks corresponding to the R-wave, as well as the P- and T-peaks, exceed the old $R_x$ level, the comparator output is energized four time during the overall sequence. One-shot multivibrator 24 has a time period such that once its output is energized, it remains energized for a time interval greater than that between the two peaks in the filtered ECG. waveform corresponding to the R-wave. As shown in FIG. 3D, when the comparator output goes positive due to the filtered P-wave exceeding the old $R_x$ level, the multivibrator is triggered for T seconds. Similarly, when the comparator goes positive due to the first peak of the two peaks in the filtered ECG. signal corresponding to the R-wave, the multivibrator goes positive for a second time. The second peak has no effect on the multivibrator since it has already been triggered and the time period T has not yet elapsed. Finally, when the comparator output goes positive due to the T-wave in the filtered ECG. signal exceeding the old $R_x$ level, the multivibrator is triggered for a third time. The purpose of FIG. 3D is to illustrate that if the threshold level $R_x$ does not adjust itself together with an increase in the signal amplitude, it is possible for the output multivibrator, which in the ideal case is triggered only once for every ECG. signal, to be triggered three times.

FIG. 3E shows the comparator output which is derived in accordance with the principles of the invention, where the threshold level changes with the signal amplitude. Here, the P- and T-waves in the filtered ECG. signal do not exceed the new $R_x$ level. The comparator output goes positive twice, corresponding to the two peaks in the filtered ECG. signal derived from the original R-wave. The first peak triggers the multivibrator as shown in FIG. 3F, and since the second peak occurs during the multivibrator operation the multivibrator generates only one pulse for the ECG. signal.

Conversely, if the ECG. signal should decrease in amplitude, were the threshold level to remain the same it is possible that it would not be exceeded by the two R-peaks in the filtered ECG. signal. But because the $R_x$ level follows the R-peak, the $R_x$ level is decreased to a value between the R-peaks on the one hand, and the P- and T-peaks on the other.

FIG. 4 depicts a more detailed illustrative embodiment of the invention. In its broad aspects the circuit is the same as that of FIG. 2. The major difference is the inclusion of a full-wave rectifier. The full-wave rectifier has the effect of producing a third peak (between the original two peaks) in the filtered, rectified ECG. signal corresponding to the R-wave. While the comparator output is energized three times corresponding to the R-wave, since all three changes occur during the time period of multivibrator 24 only one pulse is generated for each heartbeat.

Differential amplifier 12 is connected to patient 10 in the conventional manner. Signals of opposite polarities appear on the two output conductors of the amplifier. Otherwise, the signals are identical. Each signal is passed through a first high pass filter including a capacitor 30 and a resistor 32. The differentiated signal is in turn passed through another high pass filter including a capacitor 34 and a resistor 36. Each of the differentiated signals, of opposite polarities, is applied to the base of a respective one of transistors 62. The collector of each transistor is connected to a positive potential source 40, and the emitter of each transistor is connected through a resistor 44 to negative potential source 38. Each of the transistors is thus connected in an emitter follower configuration. Capacitors 48 are provided to AC-couple the outputs of the two emitter followers to the full-wave rectifier. The capacitors are sufficiently large in magnitude to prevent any further differentiation of the ECG. signals.

In the illustrative embodiment of the invention shown in FIG. 4, all of the positive potential sources have a magnitude of 15 volts, and all of the negative potential sources have a similar magnitude of 15 volts. In addition, each diode has a 0.7-volt forward voltage drop and the emitter-base junction of each transistor has a similar forward voltage drop.

Current flows from positive potential source 46 through resistor 17 and diode 52 to ground. Since the diode has a 0.7-volt drop across it, its anode is held at 0.7-volt. The current through resistor 17 equals the voltage drop across it divided by the value of the resistor. The voltage drop across the resistor is 15−0.7 or 14.3 volts. Typically, resistor 17 can have a value of 10,000 ohms so that the current through resistor 17 is 1.43 milliamperes. This current divides equally between the two resistors 50. The current through each of diodes 54 is thus 0.715 milliamperes, a total current of 1.43 milliamperes flowing through resistor 56 to ground. The purpose of this arrangement is to insure that both of diodes 54 are forward biased. The ECG. signal transmitted through each of capacitors 48 is similarly transmitted through the corresponding diode 54 to the base of transistor 64. However, only the positive portion of each signal is transmitted through the diode. The negative portion of each signal reverse biases the corresponding diode and is not transmitted to the base of transistor 64. Actually, since each diode is forward biased by 0.7 volt, a small portion of the negative part of each ECG. signal is transmitted to the base of transistor 64. Since each ECG. signal which is AC-coupled through capacitor 48 in a typical situation has a voltage swing of 10 volts both above and below the quiescent level at the anode of each of diodes 54, only a fraction of the negative signal gets through each diode. The purpose of forward biasing both of diodes 54 is to enable the complete positive portion of each ECG. signal to be transmitted through the respective diode without "wasting" the first part of it for the purpose of forward biasing the diode.

Only one of the two diodes conducts at any time (except for a small overlap around the quiescent level as discussed immediately above). The net effect is that the ECG. signal is full-wave rectified. Capacitor 58 is provided simply to eliminate the response of transistor 64 to high frequency interference. It has no effect on the frequencies comprising the filtered ECG. signal. Transistor 64 is connected in a conventional emitter follower configuration. The full-wave rectified, filtered ECG. signal is transmitted through the transistor and capacitor 68 to the DC restorer circuit. The signal includes three peaks corresponding to the R-wave, With reference to FIG. 3B, it is seen that if the negative peak corresponding to the R-wave is rectified there results three positive peaks corresponding to the R-wave.

The purpose of the DC restorer is to change the quiescent level of the rectified, filtered ECG. signal. The DC level of the signal to the left of capacitor 68 is dependent upon the operating point of transistor 64. The emitter-base junction of transistor 82 is forward biased by the current flowing from potential source 84 through resister 86, the junction, diode 74 and resistor 72 to potential source 70. Current also flows from the ground through diodes 76, 78 and resistor 72 to negative source 70. Consequently, since the voltage drop across each of diodes 76, 78 is 0.7-volt, the junction of diodes 76 and 74 is held at −1.4 volts. The drop across diode 74 is 0.7-volt and thus the quiescent level at the base of transistor 82 is −0.7 volt. Diode 74 is reverse biased for signals more negative than this value. Consequently, the peak of the signal at the base of transistor 82 is restored to −0.7 volt.

The emitter-base junction of the transistor has a voltage drop of 0.7 volt, and the emitter of the transistor thus has a quiescent level of a negative value corresponding to the peak signal swing at the base of the transistor, with the maximum peak of the signal causing the emitter potential to jump to ground level.

The signal at the base of transistor 82 is also extended through the DC restorer comprising capacitor 92 and diode 94. This DC restorer is required because the subsequent stage might distort the waveform. Due to the 0.7-volt drop across diode 94, the upper level of the signal at the anode of the diode is at 0.7 volts. Resistor 96 is across diode 94 primarily for temperature stability purposes.

The negative-going signal transmitted through capacitor 92 charges capacitor 100 through diode 98. Capacitor 100 charges to 1.4 volts less than the peak signal level due to the voltage drops across diodes 94 and 98. Diode 102 and capacitor 104 serve as an additional peak detector, two stages being provided for stabilization purposes. Since there is a 0.7-volt drop across diode 102, the voltage at the base of transistor 120 is 2.1 volts above ground in the absence of any signal. With a filtered, rectified ECG. signal, the voltage at the base of transistor 120 is negative but less than the peak amplitude of the signal by 2.1 volts.

Resistor 106, together with capacitor 104, primarily determine the time constant of the peak detector. If the signal level decreases, the voltage across the capacitor must decrease if the new $R_x$ level is to be smaller than the old one. The capacitor discharges through resistor 106 but relatively slowly. Similarly, if the peak level suddenly increases, the voltage across capacitor 104 does not increase instantaneously, but instead increases at a rate dependent upon the time constant of the circuit. Typically, capacitor 104 has a value of 100 microfarads and resistor 106 has a value of 100 kilohms; the time constant of the circuit is approximately 10 seconds. Although capacitor 104 could discharge through the various diodes, since the impedance of these diodes varies to a great extent with temperature, it is preferable to provide a separate resistor 106 to control the time constant of the circuit.

Transistor 120 is forward biased by current flowing from source 108 through the transistor, diodes 110 and resistor 112 to negative source 114. In the absence of a signal the base of transistor 120 is at a potential of 2.1 volts. Since there is a 0.7-volt drop across each of diodes 110 as well as the emitter-base junction of transistor 120, the junction of the lowermost of diodes 110 and resistor 112, in the absence of any signal, is at ground potential. The potential at this junction, in the presence of a signal, is negative and is at the level corresponding to the full signal swing at the base of transistor 82. Consequently, the voltage (R) impressed across potentiometer 116 corresponds to the peak of the R-wave in the filtered ECG. signal. The center tap of potentiometer 116 is adjusted such that the fraction of the full voltage on conductor 118 falls somewhere between the peak of the R-wave, and the larger of the P- and T-waves. Of course, the potentiometer can be adjusted to accommodate different patients, although in most cases an initial adjustment for any patient will be sufficient.

Comparator 88 can be any of many well known types. The comparator output, coupled to the input of multivibrator 90, is low as long as the negative signal at the emitter of transistor 82 is smaller in magnitude then the negative DC potential on conductor 118. As soon as the ECG. signal at the emitter of transistor 82 exceeds in magnitude the potential of conductor 118 the comparator output goes high. It remains high until the initial polarity is achieved once again.

Each time the output of comparator 88 goes high, one-shot multivibrator 90 is triggered. If the comparator output is energized while the multivibrator is pulsing, it has no effect on the multivibrator. As discussed above, this prevents more than one multivibrator pulse for each R-wave. The circuit functions to provide a single pulse OS at the output of the multivibrator for every R-wave in the ECG. signal—independent of the amplitude of the signal over a very wide range.

The invention has been described with reference to an ECG. system. It is apparent that the principles of the invention are applicable to other systems in which a particular wave in any input signal may have to be examined to determine whether it exceeds a relative threshold level, where the entire input signal itself varies in amplitude. Also, by appropriately processing any signal of interest and selecting a threshold level which is a fixed fraction of the peak swing of the processed signal, the relative parts of the processed signal above and below an arbitrary fractional level can be distinguished independent of the signal magnitude. Nor is it necessary, as is done in the system of FIG. 4, to provide diodes or other elements to achieve equal levels on the two comparator inputs in the absence of a signal input. Any offset can be built into the system. For example, if diodes 110 in FIG. 4 are omitted, the comparator output will be energized when the signal to the comparator exceeds a level equal to the selected fraction of the full swing less 1.4 volts. (The term fixed "fraction" of a signal in the appended claims is to be taken as including an offset value of this type.) Thus although the invention has been described with reference to particular embodiments, it is to be understood that these embodiments are merely illustrative of the application of the principles of the invention. Numerous modifications may be made therein and other arrangements may be devised without departing from the spirit and scope of the invention.

I claim:

1. In electrocardiographic monitoring equipment, an R-wave detection circuit comprising means for attenuating the low frequency components with respect to the high frequency components in an electrocardiographic signal to form a signal having one or more peaks corresponding to the QRS complex in each electrocardiographic waveform, means for deriving a threshold level which is a fraction of the peak amplitude of the formed signal averaged out over a number of cycles, said fraction having a value such that said threshold level is below at least one of the peaks in the formed signal corresponding to the QRS complex in the electrocardiographic waveform and above any peaks in the formed signal corresponding to the P- and T-waves in the electrocardiographic waveform, means for comparing the instantaneous value of said formed signal to said threshold level, and indicating means responsive to the operation of said comparing means for indicating occurrence of said QRS complex.

2. Monitoring equipment in accordance with claim 1 wherein said indicating means further includes means responsive to said comparing means for generating a single output signal during a comparison in which one or more of the peaks in said formed signal exceed said threshold level.

3. Monitoring equipment in accordance with claim 1 further including means for rectifying said formed signal prior to the application of said formed signal to said comparing means and to said threshold level deriving means.

4. Monitoring equipment in accordance with claim 2 further including means for rectifying said formed signal prior to the application of said formed signal to said comparing means and to said threshold level deriving means.

5. Monitoring equipment in accordance with claim 1 and wherein said threshold level deriving means includes a peak detector for repetitively detecting peak values of repetitive QRS complexes, each of said detected peak values being related to one of said QRS complexes, and a voltage divider operatively connected to said peak detector for providing a fractional amount of each of said detected peak values, said fractional amount being proportional to said threshold level.